US009712515B2

(12) United States Patent
Sanjeev et al.

(10) Patent No.: US 9,712,515 B2
(45) Date of Patent: Jul. 18, 2017

(54) VERIFYING AN IDENTITY OF A MESSAGE SENDER

(71) Applicant: Cellco Partnership, Basking Ridge, NJ (US)

(72) Inventors: Kumar Sanjeev, San Ramon, CA (US); Amir Mayblum, Walnut Creek, CA (US); Eliezer K. Pasetes, San Ramon, CA (US); Sethumadhav Bendi, Walnut Creek, CA (US); Jerry M. Kupsh, Concord, CA (US); Alice Yuan Bain, Morristown, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 867 days.

(21) Appl. No.: 13/723,326

(22) Filed: Dec. 21, 2012

(65) Prior Publication Data

US 2014/0181933 A1 Jun. 26, 2014

(51) Int. Cl.
*H04L 29/06* (2006.01)

(52) U.S. Cl.
CPC ........ *H04L 63/0823* (2013.01); *H04L 63/083* (2013.01); *H04L 63/123* (2013.01); *H04L 63/126* (2013.01)

(58) Field of Classification Search
USPC .................................. 726/2–4; 709/223–225
See application file for complete search history.

(56) References Cited

U.S. PATENT DOCUMENTS

| 6,122,372 | A | * | 9/2000 | Hughes | H04L 9/3236 380/2 |
| 6,446,206 | B1 | * | 9/2002 | Feldbaum | H04L 63/0823 713/170 |
| 7,865,557 | B2 | * | 1/2011 | Tomkow | G06Q 10/107 709/203 |
| 2005/0144242 | A1 | * | 6/2005 | Marston | H04L 12/58 709/206 |
| 2005/0246346 | A1 | * | 11/2005 | Gerdes | H04L 63/029 |
| 2006/0123085 | A1 | * | 6/2006 | Burns | H04L 51/38 709/206 |
| 2006/0250578 | A1 | * | 11/2006 | Pohl | G06F 3/0238 351/210 |
| 2007/0124388 | A1 | * | 5/2007 | Thomas | G06Q 10/107 709/206 |
| 2007/0269041 | A1 | * | 11/2007 | Bhatnagar | H04L 12/58 380/30 |
| 2009/0210713 | A1 | * | 8/2009 | Ourega | H04L 63/123 713/176 |

(Continued)

*Primary Examiner* — Harris C Wang

(57) ABSTRACT

A system includes a gateway and a verification server. The gateway is configured to receive a first message from a client over a network; send a request to a verification server to generate a first credential based on the first message; and route the first message toward a remote device. The verification server is configured to receive the request from the gateway; generate the first credential in response to the request; store the first credential; receive a second message from the remote device, the message requesting the verification server to validate a second credential; determine whether the second credential is valid based on the first credential; and send a notification to the remote device indicating whether the second credential is valid.

20 Claims, 10 Drawing Sheets

(56) References Cited

U.S. PATENT DOCUMENTS

| | | | |
|---|---|---|---|
| 2010/0158101 A1* | 6/2010 | Wu | H04N 21/23424 375/240.01 |
| 2011/0093617 A1* | 4/2011 | Igarashi | H04N 21/23406 709/246 |
| 2011/0145889 A1* | 6/2011 | Tomkow | H04L 12/5875 726/3 |
| 2012/0066498 A1* | 3/2012 | Engert | 713/170 |

* cited by examiner

FIG. 8A

| CUSTOMER 804 | USER NAME 806 | PASSWORD 808 |
|---|---|---|
| HOSTESS | KSANJEEV | ********** |
| FAST AIRLINES | AMAYBLUM | *************** |
| HORIZON | EPASETES | ********* |
| KOMI | SBENDI | ******** |

| SENDER 814 | RECEIVE TN 816 | HASH 818 | TIME/DATE 820 |
|---|---|---|---|
| HOSTESS | 925-555-1253 | | 12-4-2012 09:20:12 |
| FAST AIRLINES | 703-232-9823 | | 12-4-2012:10:10:43 |
| HORIZON | 571-933-2301 | | 12-4-2012:11:12:32 |
| KOMI | 202-234-2343 | | 12-4-2012:14:32:40 |

812

822-1, 822-2, 822-3, 822-4

US 9,712,515 B2

VERIFYING AN IDENTITY OF A MESSAGE SENDER

BACKGROUND

Current techniques for securely providing information from a network device to a user device include establishing a communication session between the network device and the user device over a secure socket layer, exchanging messages with digital signatures, and/or authenticating the user device based on public-key encryption.

BRIEF DESCRIPTION OF THE DRAWINGS

FIG. 8A illustrates an exemplary security database at the message application gateway device of FIG. 2;

FIG. 8B illustrates an exemplary user identity hash/checksum database at the verification server device of FIG. 2.

DETAILED DESCRIPTION

The following detailed description refers to the accompanying drawings. The same reference numbers in different drawings may identify the same or similar elements. As used herein, the terms "user," "consumer," "subscriber," "party," and/or "customer" may be used interchangeably. Also, the terms "user," "consumer," "subscriber," "party," and/or "customer" are intended to be broadly interpreted to include a user device or a user of a user device.

Figure 1A:
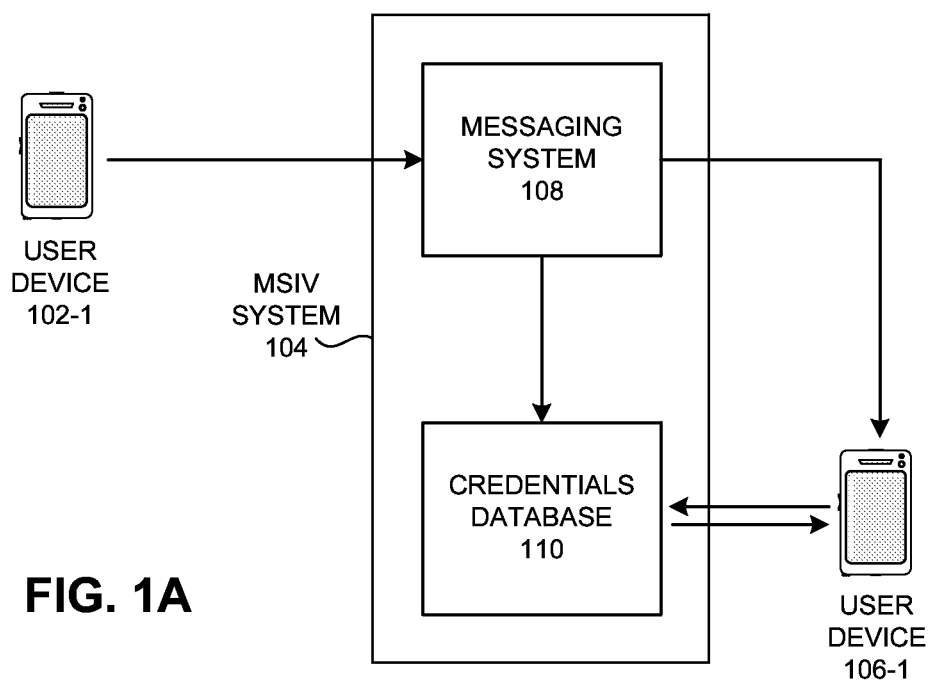
FIG. 1A illustrates an overview of the concepts described herein.

As described below in detail, a message sender identity verification (MSIV) system may confirm, to a receiver of the message, that a message sender is the party that the message identifies as the sender. FIG. 1A illustrates an overview of the concepts described herein. As shown, environment 100 may include: a user device 102-1, a MSIV system 104, and a user device 106-1.

In FIG. 1A, user device 102-1 may send a message to user device 106-1 via MSIV system 104. MSIV system 104, which may include a messaging system 108 and credentials database 110, may receive the message from user device 102-1, and route the message to user device 106-1.

In FIG. 1A, when MSIV system 104 receives the message, messaging system 108 generates a first user credential based on the message, stores the first user credential in credentials database 110, and routes the message to user device 106-1. When user device 106-1 receives the message, user device 106-1 may generate a second credential based on the message and send the second credential to credentials database 110. When credentials database 110 finds a match between the first and the second credentials, credentials database 110 may indicate, to user device 106-1, that the second credential is valid. If user device 106-1 has received a message whose credential cannot be verified at credentials database 110, user device 106-1 would know that the message cannot be trusted (e.g., the message may not have been sent by user device 102-1).

Figure 1B:
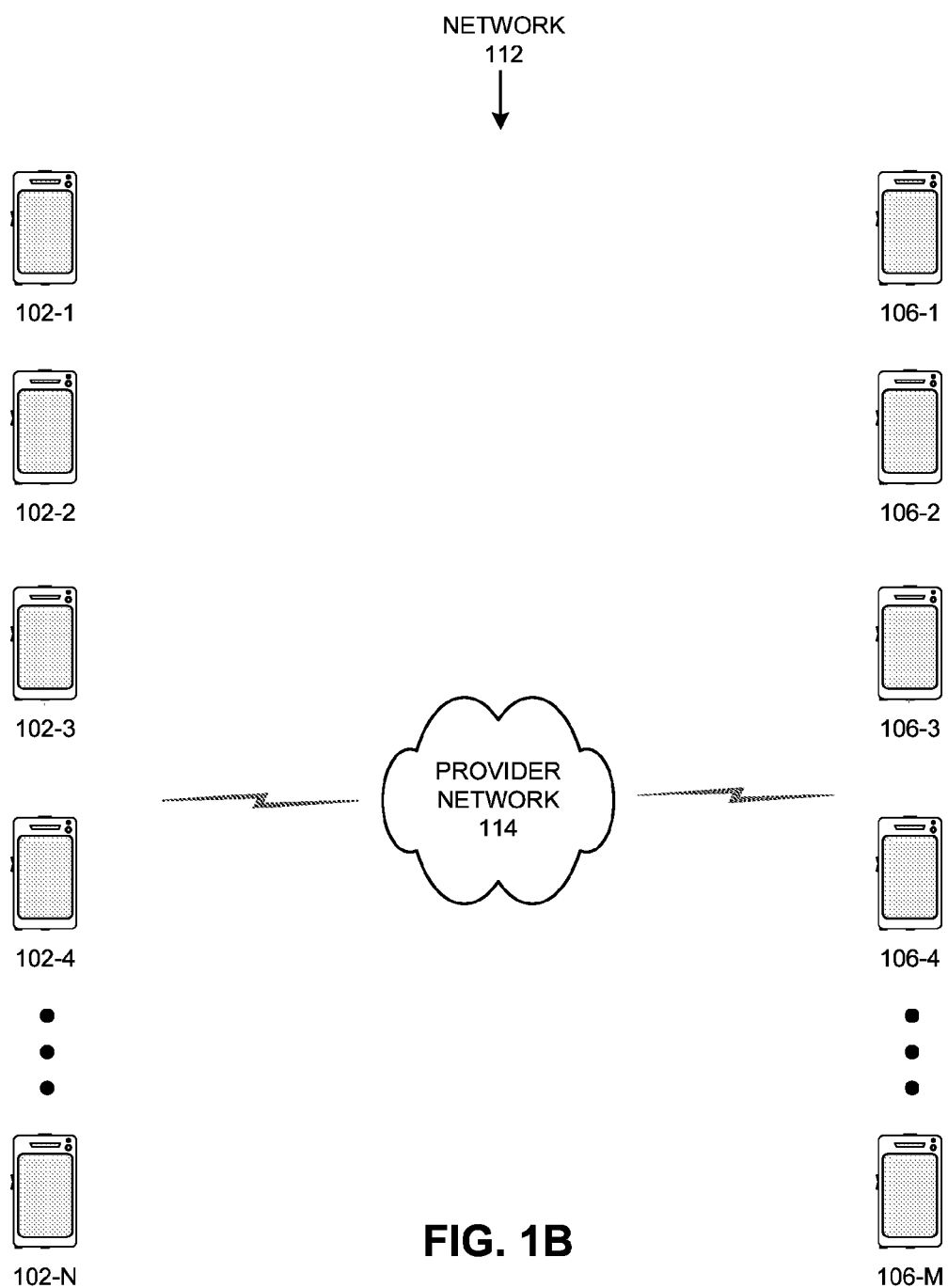
FIG. 1B illustrates an exemplary network in which the concepts described herein may be implemented.

FIG. 1B illustrates an exemplary network 112 in which concepts described herein may be implemented. Network 112 may include one or more public switched telephone networks (PSTNs) or another type of switched network (e.g., an optical network). Network 112 may also include a number of transmission towers for receiving wireless signals and forwarding the signals toward the intended destination. Network 112 may further include one or more packet switched networks, such as an Internet protocol (IP) based network, a local area network (LAN), a wide area network (WAN), a personal area network (PAN), an intranet, the Internet, or another type of network (e.g., a satellite-based network) that is capable of exchanging information.

As further shown, network 112 includes provider network 114; user devices 102-1 through 102-N (collectively referred to as "user devices 102" and individually as "user device 102"); and user devices 106-1 through 106-M (collectively referred to as "user devices 106" and individually as "user device 106"). Provider network 114 may include an intranet, a switched network, a PSTN, a cellular network, and/or another type of network. One or more individual network(s) in provider network 114 may include devices or components for routing messages, calls, etc. In particular, provider network 114 may include MSIV system 104 (not shown in FIG. 1B).

User device 102/106 may include a handset, cellular phone, smart phone, personal computer, laptop computer, tablet computer, set-top box, gaming console, personal digital assistant (PDA), smart television (TV), and/or another type of communication and/or computational device that is capable of receiving and sending messages.

Network 112 in FIG. 1B is shown for simplicity. Although not illustrated, network 112 includes additional devices such as bridges, routers, switches, servers, gateways, etc. For example, network 112 may include thousands or millions of user devices (e.g., N>1,000,000, M>1,000,000, etc.). Devices in the networks may communicate with one another by wireless or wired connections.

Figure 2:
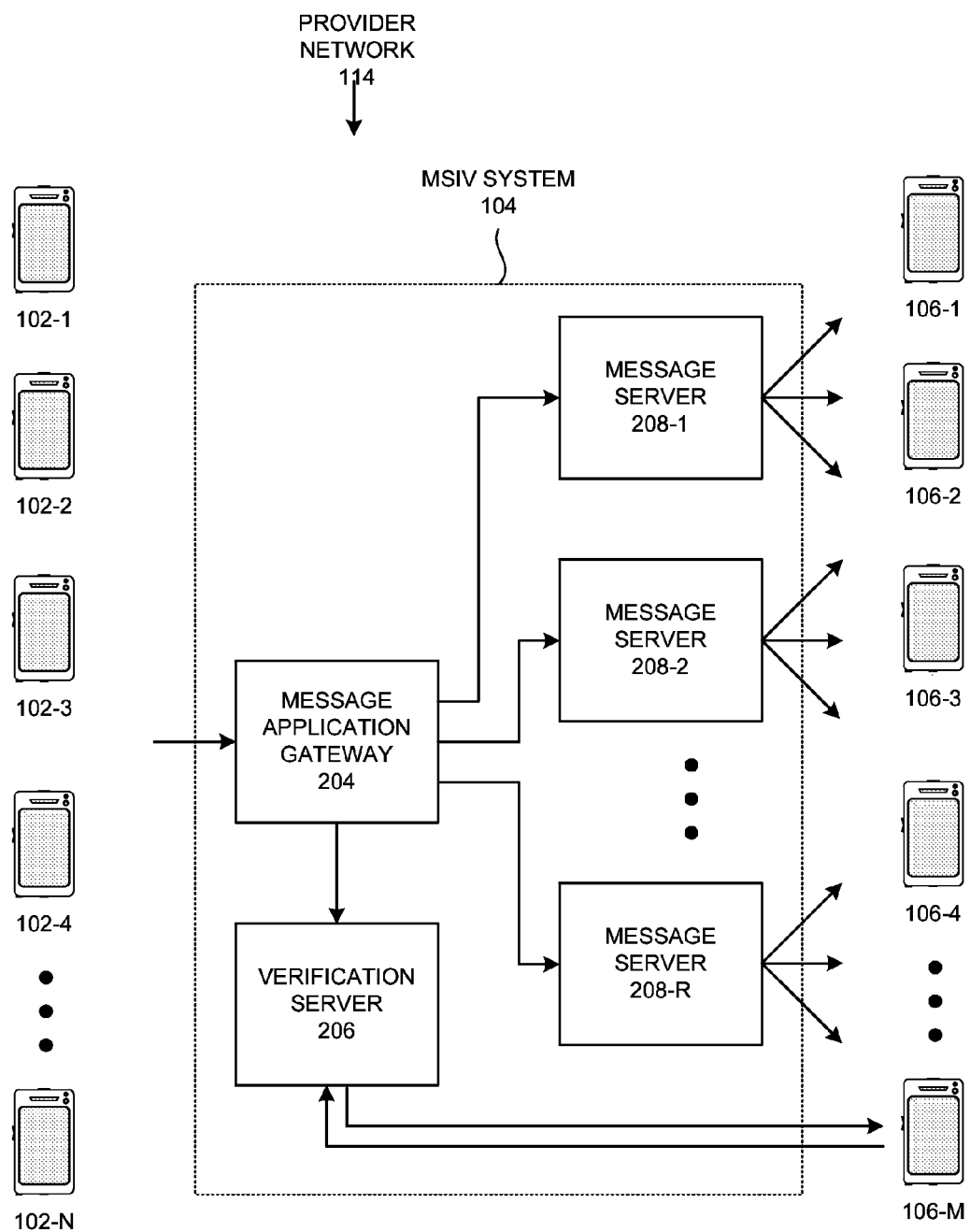
FIG. 2 illustrates the provider network of FIG. 1B and exemplary devices of the exemplary message sender identity verification (MSIV) system of FIG. 1A.

FIG. 2 illustrates provider network 114 and MSIV system 104. As shown, provider network 114 may include MSIV system 104. In other implementations, MSIV system 104 may be included in another type of network, such as a public network (e.g., the Internet). As further shown, MSIV system 104 may include a message application gateway device 204, a verification server device 206, and message server devices 208-1 through 208-R (collectively "message server devices 208" and individually "message server device 208").

Message application gateway device 204 may generate user registration information based on input from a user, for the user to subscribe to the MSIV service. The registration information may include the user password, the user identifier (ID), etc. As further described below with reference to FIG. 4, message application gateway device 204 may store the information, and send a portion of the information to verification server device 206.

Once a user is registered, the user may log into MSIV system 104 (e.g., via authentication at message application gateway device 204 or verification server device 206) and send a message, whose ultimate destination is user device 106-1, to message application gateway device 204. The message may include short message service (SMS) message, a multimedia messaging service message (MMS), a rich communication service (RCS) chat message, a RCS file, enhanced messaging service (EMS) message, etc., over a particular communication protocol and/or call interfaces, such as the short message peer-to-peer (SMPP) protocol, the Telocator Network Paging protocol (TNPP), the simple network paging protocol (SNPP), a multimedia messaging (MM) service (MMS) interface (e.g., MM7, MM4, etc.), etc.

Upon receipt of the message, message application gateway device 204 relays the message to message server device 208. When message server device 208 returns a message identifier (ID) in response, message application gateway device 204 sends a request, to verification server device 206, to create a hash or a checksum for the message and/or the user. Message application gateway device 204 may send the request in accordance with, for example, hypertext transfer protocol (HTTP), HTTP secure (HTTPS), file transfer protocol (FTP), secure FTP (SFTP), etc.

Verification server device 206 may receive a portion of the registration information from message application gateway device 204. Upon receipt of the information from message application gateway device 204, verification server device 206 may store the information in a local database (not shown in FIG. 2). The registration information may include information about the user (e.g., an ID associated with the user, a description, a password, etc.).

Verification server device 206 may also participate in validating the identity of a sender of a message. When message application gateway device 204 receives a first message from user device 102, message application gateway device 204 routes the first message toward user device 106 (e.g., the destination of the first message), as well as send a second message to verification server device 206. The second message may prompt verification server device 206 to create and store a hash or a checksum generated based on the message ID, a time stamp associated with the first message, an identifier associated with the message recipient (e.g., an email address of the user of user device 106-1), and/or the content of the first message.

When user device 106-1 receives the first message from message server device 208, user device 106 may generate and send a second hash/checksum to verification server device 206, requesting verification server device 206 to validate the identify of the sender. In response, verification server device 206 compares the stored hash/checksum of the first message to the second hash/checksum included in the request. Verification server device 206 may indicate to user device 106 the result of the comparison. User device 106 and verification server device 206 may communicate in accordance with a particular protocol, such as HTTPS, SFTP, HTTP, FTP, etc.

Message server device 208 may receive a message relayed by message application gateway device 204 from user device 102, and forward the message toward its destination (e.g., user device 106). Depending on the message, message server device 208 may receive the message from message application gateway device 204 in accordance with a particular communication protocol or a particular set of interfaces, such as SMPP, MM7, etc. Similarly, in forwarding the message, message server device 208 may use one of many protocols and/or sets of interfaces, such as Signaling System Number 7 (SS7) protocol, MM1, etc.

Devices that are illustrated in FIG. 2 are exemplary. Depending on the implementation, MSIV system 104 may include additional, fewer, different, or a different arrangement of devices than those illustrated in FIG. 2. For example, in some implementations, a single device may perform functions of two or more devices in FIG. 2; in other implementations, two or more devices may perform functions of a single device in FIG. 2. More specifically, for example, in one implementation, a single device may include the functionalities of both message application gateway device 204 and verification server device 206.

Figure 3:
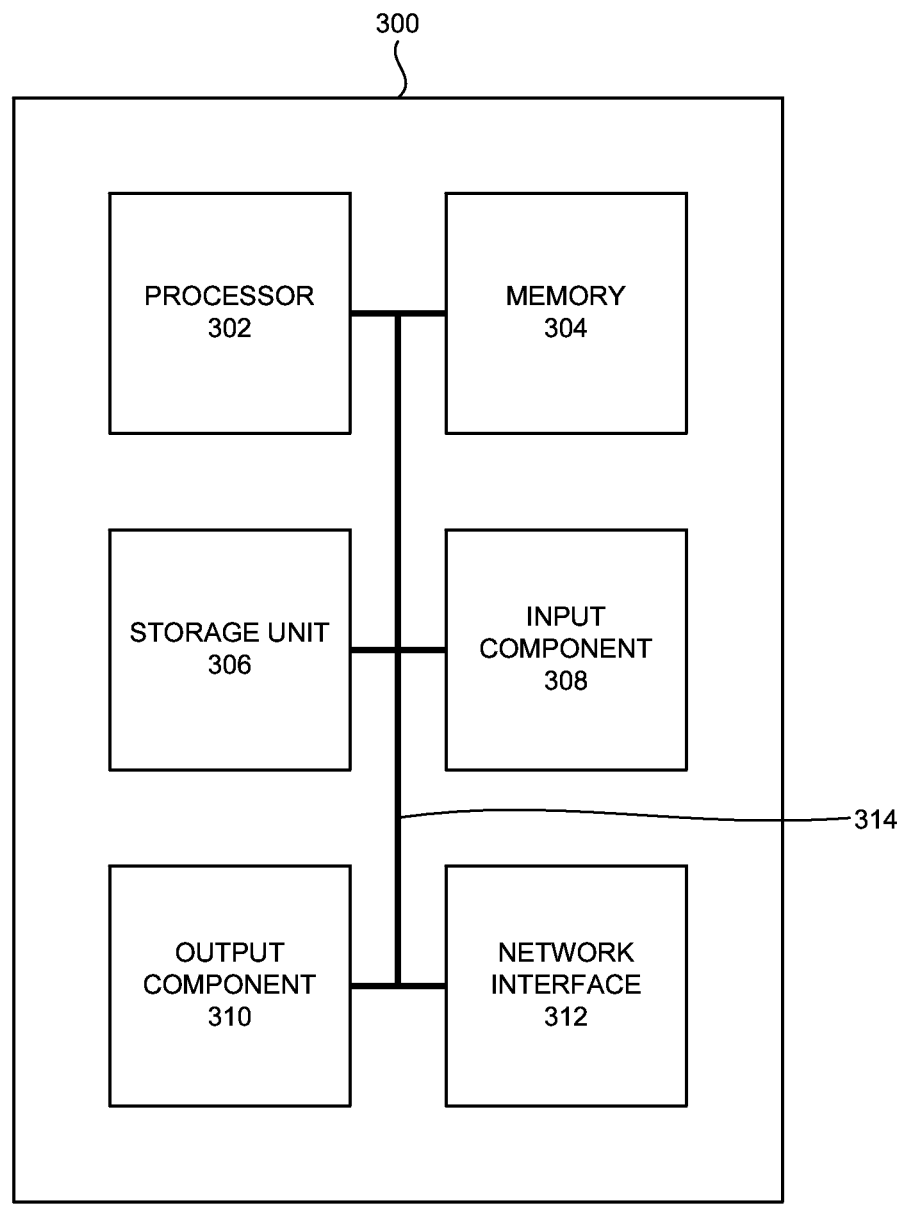
FIG. 3 is a block diagram of exemplary components of a network device of FIG. 2.

FIG. 3 is a block diagram of exemplary components of a network device 300. Each of the devices in FIG. 2 may include one or more network devices 300. As shown, network device 300 may include a processor 302, memory 304, storage unit 306, input component 308, output component 310, network interface 312, and communication path 314. In different implementations, network device 300 may include additional, fewer, different, or different arrangement of components than the ones illustrated in FIG. 3. For example, network device 300 may include line cards for connecting to external buses.

Processor 302 may include a microprocessor (e.g., a single core, a dual core, a quad core, etc.), an Application Specific Integrated Circuit (ASIC), a Field Programmable Gate Array (FPGA), and/or other processing logic (e.g., embedded devices) capable of controlling network device 300. Memory 304 may include static memory, such as read only memory (ROM), and/or dynamic memory, such as random access memory (RAM), or onboard cache, for storing data and machine-readable instructions (e.g., programs, scripts, etc.). Storage unit 306 may include a floppy disk, CD ROM, CD read/write (R/W) disc, and/or flash memory, as well as other types of storage devices (e.g., hard disk drive) for storing data and/or machine-readable instructions (e.g., a program, script, etc.).

Input component 308 and output component 310 may provide input and output from/to a user to/from network device 300. Input/output components 308 and 310 may include a display screen, a keyboard, a mouse, a speaker, a microphone, a camera, a DVD reader, Universal Serial Bus (USB) lines, and/or other types of components for converting physical events or phenomena to and/or from signals that pertain to network device 300.

Network interface 312 may include a transceiver (e.g., a transmitter and a receiver) for device 300 to communicate with other devices and/or systems. For example, via network interface 312, network device 300 may communicate over a network, such as the Internet, an intranet, a terrestrial wireless network (e.g., a WLAN, WiFi, WiMax, etc.), a satellite-based network, optical network, etc. Network interface 312 may include a modem, an Ethernet interface to a LAN, and/or an interface/connection for connecting network device 600 to other devices (e.g., a Bluetooth interface).

Communication path 314 may provide an interface through which components of network device 300 can communicate with one another.

Network device 300 may perform the operations described herein in response to processor 302 executing software instructions stored in a non-transient computer-readable medium, such as memory 304 or storage unit 306. The software instructions may be read into memory 304 from another computer-readable medium or from another device via network interface 312. The software instructions stored in memory 304 or storage unit 306, when executed by processor 302, may cause processor 302 to perform processes that are described herein.

Figure 4:
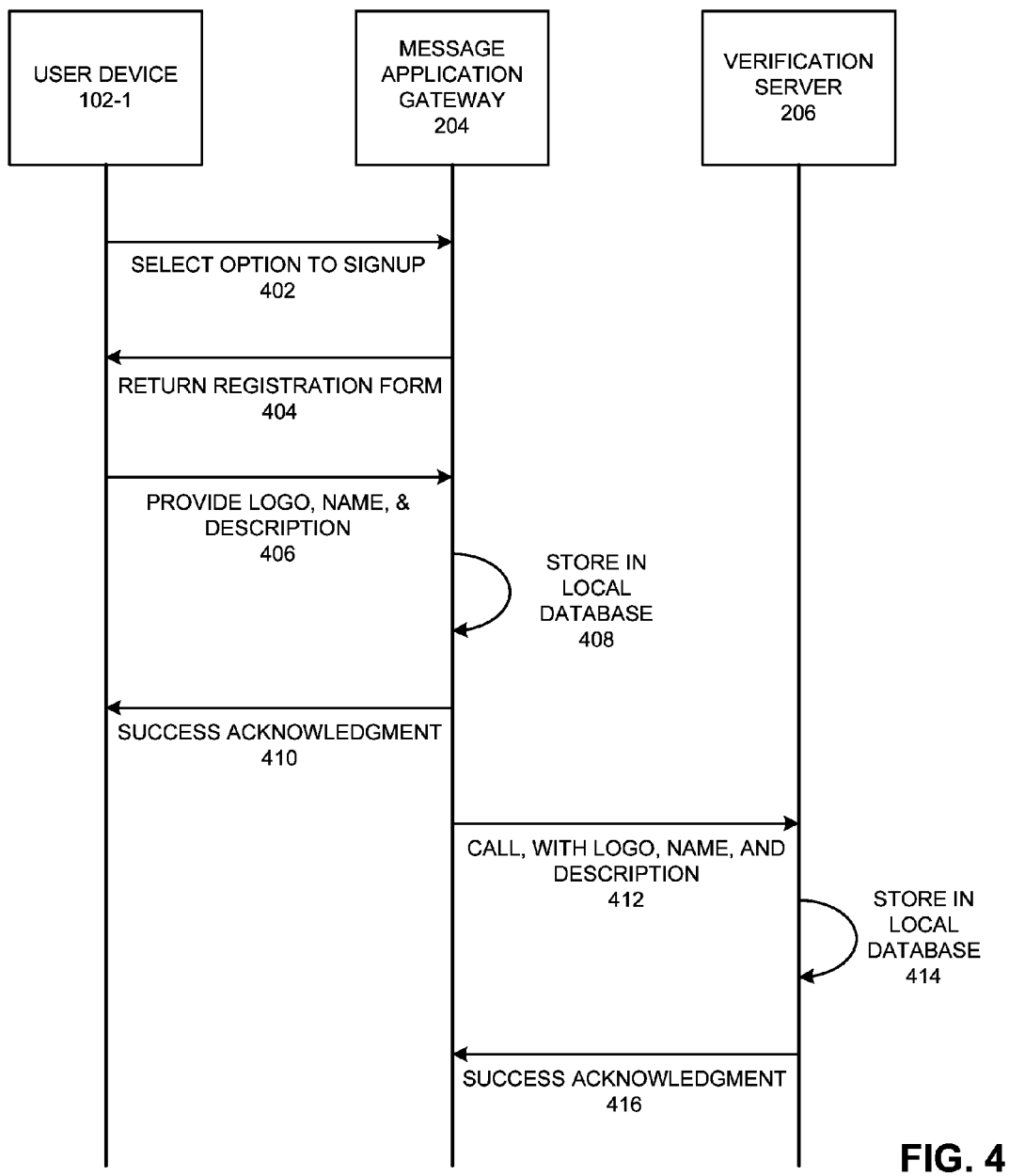
FIG. 4 illustrates an exemplary flow of messages between a user device, the message application gateway device, and the verification server device of FIG. 2 for registering a user for the MSIV service.

FIG. 4 illustrates an exemplary flow of messages between user device 102-1, message application gateway device 204, and verification server device 206 for registering a user for the MSIV service. Assume that the user wishes to allow recipients of the user's messages to verify that the user sent the messages. The user may be a business owner, an officer of a company, a staff member, a contractor, or an end user.

Assume that the user owns user device 102-1, and that a browser on user device 102-1 is at a web site for registering the user for the MSIV service. The user is presented with an option to sign up for the service. When the user selects the option, the browser at user device 102-1 sends a message (402) to message application gateway device 204. In response, message application gateway device 204 returns a registration form/page (404) to the browser.

Via the registration form, the user may provide a logo (e.g., a company logo, an image, a code representing a business, etc.), a name (e.g., the name of the user, the company name, the name of a business that the user owns, etc.), and a description (e.g., a description of the business, the user ID, etc.). In some implementations, the user may provide additional information, such as an account number, an employer identification number, a unique code that is specifically generated by the web page for the purpose of the registration, an address associated with the user (e.g., an address associated with the user's business, the user's home address, etc.), a telephone number, etc.

User device 102-1 may send the information input at the registration form ("registration information") (406) to message application gateway device 204. In response, message application gateway device 204 may store the registration information (408) in its local database. Some registration information, such as a user password, may be generated by message application gateway device 204/verification server device 206. If message application gateway device 204 successfully registers the user, message application gateway device 204 may send a success acknowledgment reply (410) to the browser hosted on user device 102-1.

Once in possession of the registration information, message application gateway device 204 may select a portion, from the registration information, that is to be used (together with other information) in the future to verify the identity of a message sender. Message application gateway device 204 may generate a call (412) to verification server device 206, sending the selected portion of the registration information to verification server device 206. The selected portion may include, for example, a logo, a user ID, password, a description, etc.

In response, verification server device may store the selected portion (414) in its local database, and send a success acknowledgment (416) to message application gateway device 204.

Depending on the implementation, a server hosted at message application gateway device 204 for the handling the registration process (e.g., sending a registration form, receiving the registration information, storing the information, etc.) may include a web server, an application server, a database, etc. In addition, depending on the implementation, user device 102-1, message application gateway device 204, and verification server device 206 may exchange additional messages, fewer messages, and/or different messages than those illustrated in FIG. 4.

Figure 5:
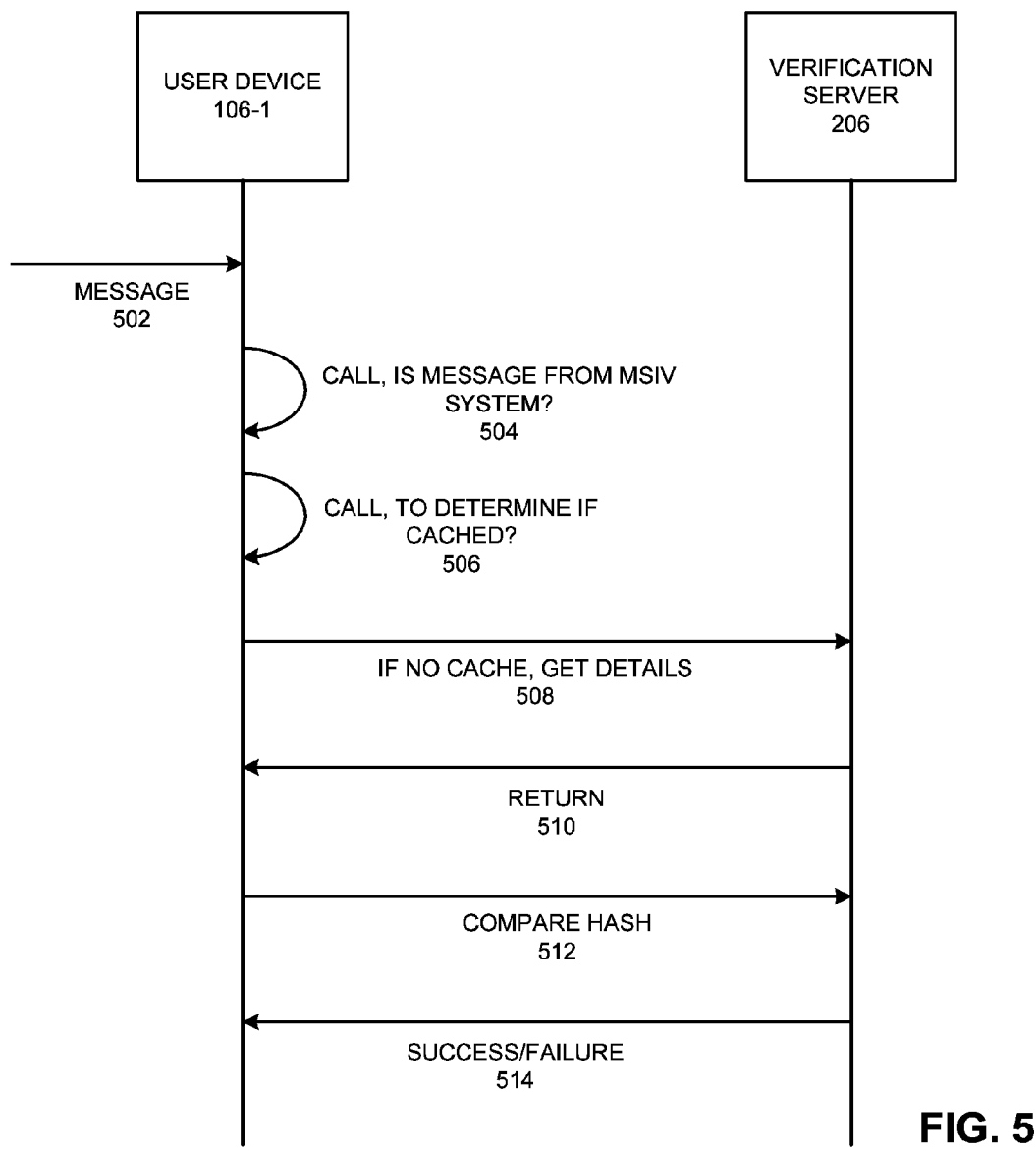
FIG. 5 illustrates an exemplary flow of messages between another user device and the verification server device of FIG. 2 for validating the identity of the sender of a message.

FIG. 5 illustrates an exemplary flow of messages between user device 106-1 and verification server device 206 for validating the identity of the sender of a message. Assume that after the registration, the user of user device 102-1 sent a message to user device 106-1 via MSIV system 104. Consequently, user device 106-1 receives the message (502).

User device 106-1 may make an internal call (e.g., a function call) (504) to determine whether the message is from MSIV system 104 and if the message is from MSIV system 104, user device 106-1 may make another internal call (506) to determine whether information about the sender is cached at user device 106-1. If the information is not cached, user device 106-1 may send a query (e.g., a HTTPS query) to verification server device 206 (508). In response, verification server device 206 may forward a reply (510) with the information. The information may be identical or similar to a portion of the registration information originally obtained by message application gateway device 204 during the registration of the user of user device 102-1 (e.g., logo, description, user ID/name, etc.).

User device 106-1 then generates a first hash/checksum using information from the message (e.g., timestamp, the identifier associated with the recipient, the message ID, etc.), and sends a request (which includes the hash/checksum) (512) to verification server device 206. To determine whether the first hash/checksum is valid, verification server device 206 compares the first hash/checksum to another, second hash/checksum. The second hash/checksum is generated based on information, obtained from message application gateway device 204, that includes a message ID (and/or the message content), the timestamp associated with the message, and an identifier associated with the user of user device 106-1. That is, the second hash/checksum is derived independently from the first hash/checksum. If the first hash/checksum matches the second hash/checksum, verification server device 206 sends a success notification (514) to user device 106-1, indicating that the sender of the message is the party identified in the message. If verification server device 206 finds that there is no second hash/checksum (e.g., because the message never went through message application gateway device 204) or that the first hash/checksum does not match the second hash/checksum, verification server device 206 may send a failure notification to user device 106-1, indicating that the identity of the sender cannot be verified/validated.

Figure 6:
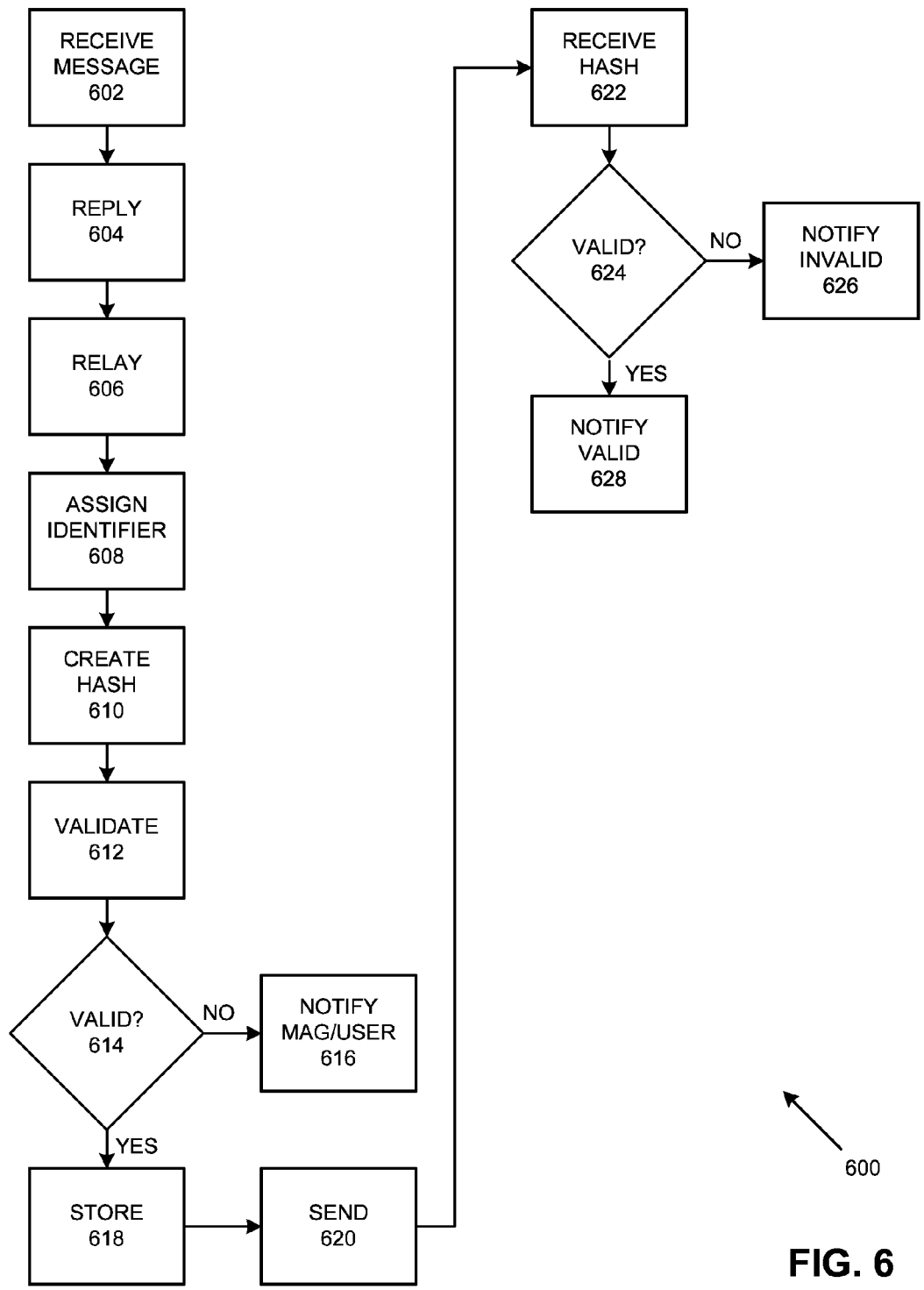
FIG. 6 is a flow diagram of an exemplary process for verifying the identity of the sender of a message.
Figure 7:
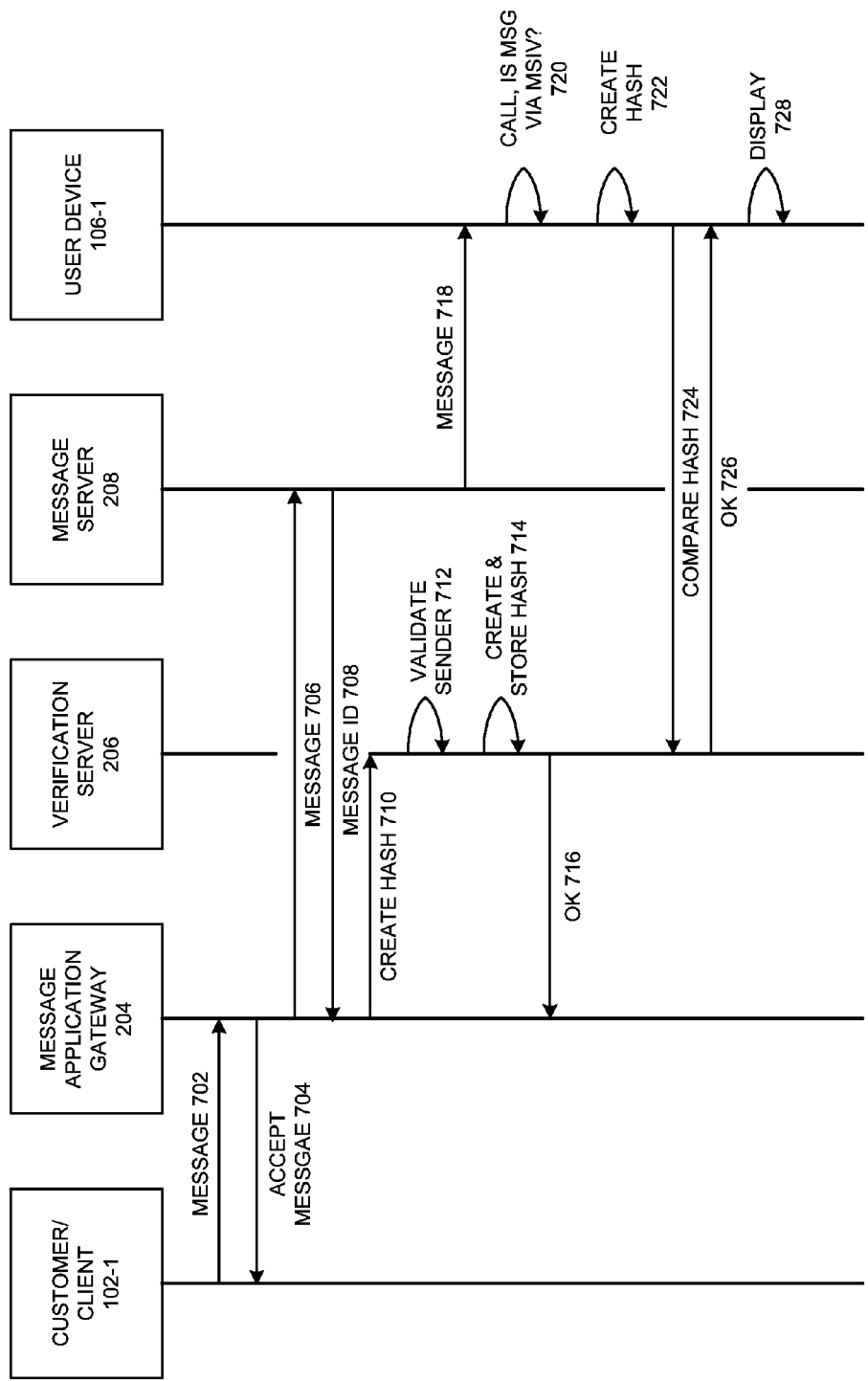
FIG. 7 illustrates yet another exemplary flow of messages between the network devices of FIG. 2 during the process of FIG. 6.

FIG. 6 is a flow diagram of an exemplary process 600 for verifying the identity of the sender of a message. Process 600 includes some of device actions/steps/functions that are associated with the flow of messages in FIG. 5, as well as device actions/steps/functions that are associated with MSIV system 104's handling of a message from user device 102-1. Assume that the user of user device 102-1 is registered with MSIV system 104, that the user is logged onto MSIV system 104, and that the user sends a message that is to be verified by the receiving user device 106-1. Process 600 is described with reference to FIG. 7. FIG. 7 illustrates an exemplary flow of messages during process 600.

As shown, process 600 may include MSIV system 104 receiving a message (702, FIG. 7) from user device 102-1 (block 602). More particularly, message application gateway device 204 of MSIV system 104 may receive the message from user device 102-1 in accordance one of communication protocols or call interfaces (e.g., SMPP, SNPP, EMS, RCS, MMS (e.g., one of MM1, MM2, etc.), etc.). Upon receipt of the message, MSIV system 104 may reply to user device 102-1 with an acknowledgment notification or an accept message (704, FIG. 7) (block 604).

MSIV system 104 may route the message internally, and obtain an ID for the message. For example, message application gateway device 104 in MSIV system 104 may relay the message to message server device 208 (706, FIG. 7) (e.g., via MM7, SMPP, etc.) in MSIV system 104 (block 606). Upon receipt of the message, message server device 208 may assign an ID to the message (block 608), and forward the message ID (708, FIG. 7) to message application gateway device 204. In some implementations, the message ID may be unique among IDs assigned to received messages.

Once the message ID has been assigned, message application gateway device 204 may send a request (710, FIG. 7) to create a hash/checksum to verification server device 206 (block 610). In one implementation, the request may include the message ID, a timestamp of the message, and an identifier associated with the recipient, and/or the message content. In response, verification server device 206 may retrieve registration information that is associated with the sender of the message and attempt to identify/validate the sender (712, FIG. 7) (block 612).

If verification server device 206 is unable to successfully validate the sender (i.e., the user of user device 102) (block 614: no), verification server device 206 may indicate its failure to message application gateway device 204 (block 616). In return, message application gateway (MAG) device 204 may notify user device 102-1 of the failure (block 616).

Verification server device 206 may be unable to validate the sender for one of many reasons. For example, the user of user device 102-1 may be registered for a message delivery service at provider network 114 without being registered for the MSIV service. In another example, for cases in which the user is required to provide another password, the user may have provided incorrect information.

Returning to block 614, if verification server device 206 is able to validate the sender (block 614: yes), verification server device 206 may create and store a first hash/checksum for the message (714, FIG. 7) (block 618). Depending on the implementation, verification server device 206 may create the first hash/checksum based on the message ID, a timestamp of the message, an identifier associated with the recipient, the message content, and/or a portion of registration information. The hash function used to generate the first hash may include secure hash algorithm (SHA)-2, SHA-3, etc.

After generating the first hash/checksum, verification server device 206 may store the hash/checksum in a secure database (714, FIG. 7) (block 618). Furthermore, verification server device 206 may notify message application gateway 204 that the hash/checksum has been successfully generated (716, FIG. 7).

Message server device 208 may forward/route the message relayed by message application gateway device 204 from user device 102-1 to destination device 106-1 (718, FIG. 7) (block 620). When user device 106-1 receives the message, user device 106-1 may invoke calls and perform functions described in connection with FIG. 5 and also shown in FIG. 7. That is, user device 106-1 may invoke a function call to verify whether the message was sent via the MSIV service (720, FIG. 7) (e.g., by checking additional information attached to the message) and if so, invoke a call to create a second hash/checksum (722, FIG. 7). Furthermore, user device 106-1 may send a query with the second hash/checksum (724, FIG. 7) to verification server device 206, requesting verification server device 206 to compare the second hash/checksum to the first hash/checksum.

Verification server device 206 may receive the query from user device 206 (block 622). The query may include the second hash/checksum and information within or derived from the message received by user device 106 (e.g., the message ID, or another piece of information). Using the information, verification server device 206 performs a look up of its hash/checksum database, in order to retrieve the first hash/checksum. If the first hash/checksum is not found (i.e., the first hash/checksum does not exist), or if the first hash/checksum does not match the second hash/checksum (block 624: no), verification server device 206 may notify user device 106-1 that the message is not valid (block 626). User device 106-1 may then indicate to its user that the identity of the sender cannot be verified (e., display that the sender ID cannot be validated).

If the first hash/checksum exists and matches the second hash/checksum (block 624: yes), verification server device 206 may notify user device 106-1 that the sender is validated (726, FIG. 7) (block 628). User device 106 may then indicate to its user that the message is from the user identified by the message (728, FIG. 7).

FIG. 8A illustrates an exemplary security database 802 at message application gateway device 204 and/or verification server device 206. Security database 802 may include information that is set during the user registration. As shown, security database 802 may include records 810-1 through 810-4 (collectively "records 810" and individually "record 810"). Furthermore, each record 810 may include a customer ID field 804, a user name field 806, and a password field 808.

Customer ID field 804 may include a character string that identifies an entity associated with an account (e.g., company account, user account, etc.). User name field 806 and password field 808 may include character strings that identify a user ID and a password. Depending on the configuration, the password may be in encrypted form.

Depending on the implementation, record 810 in database 802 may include additional or different fields than those illustrated in FIG. 8A. For example, record 810 may include additional information (e.g., user's address, a full name, phone number, etc.) that may be used to verify/confirm the user's identity. In addition, database 802 may include many more records.

FIG. 8B is an exemplary user identity hash/checksum database 812 at verification server device 206. As shown, user identity hash/checksum database 812 may include records 822-1 through 822-4 (collectively "records 822" and individually "record 822"). Furthermore, each record 822 may include a sender ID field 814, a receiver telephone number field 816, a hash/checksum field 818, and a time/date field 820.

Sender ID field 814 may include character strings that identify an entity associated with an account. Receiver telephone number field 816 may include the telephone number associated with user device 106-1. Hash/checksum field 818 may include a hash or a checksum of the message. As described above, verification server device 206 generates the hash/checksum and stores the hash/checksum in hash/checksum field 818. Time/date field 820 may include a timestamp of when the message was received by message application gateway device 204.

Depending on the implementation, record 822 in database 812 may include additional or different fields than those illustrated in FIG. 8B. For example, record 822 may include additional information that may be used to generate the hash/checksum. Furthermore, database 812 may include many more records than those illustrated in FIG. 8B.

Figure 9:
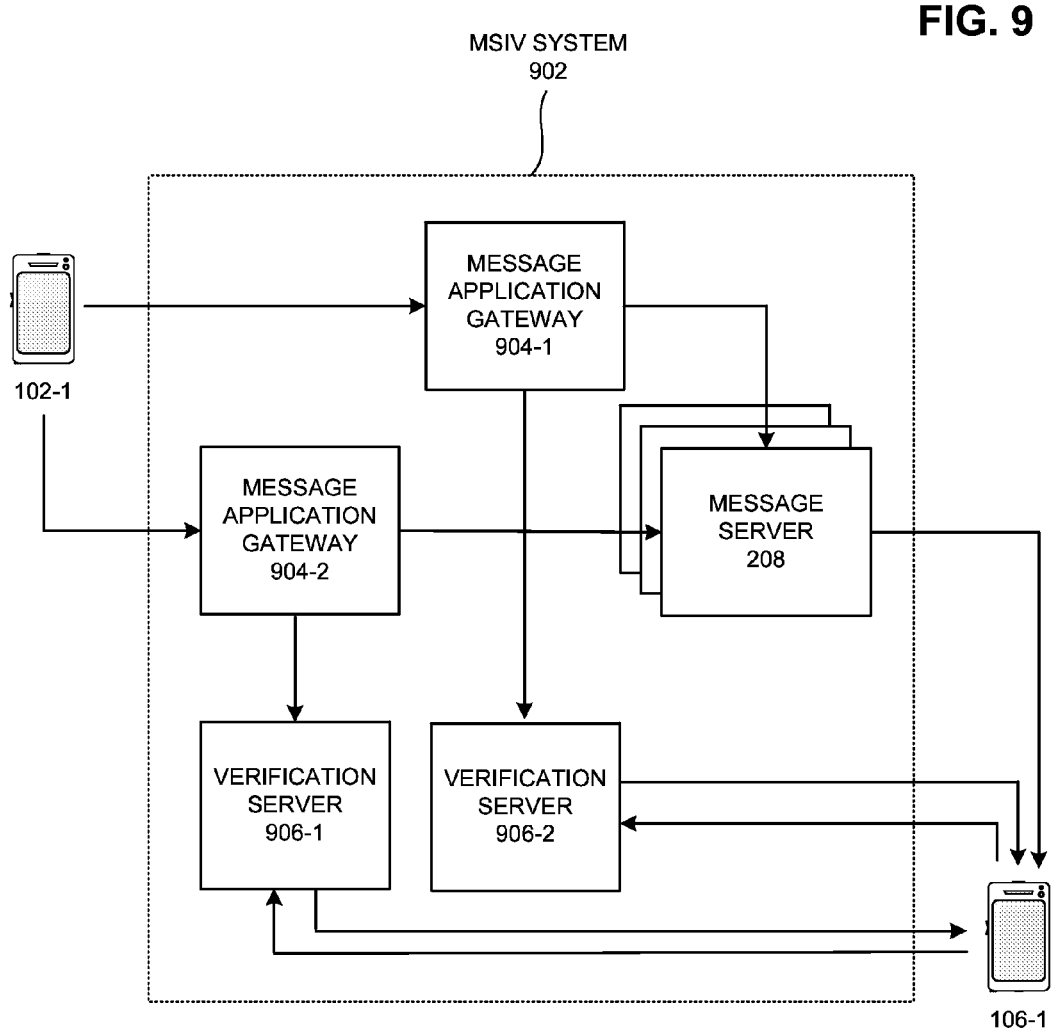
FIG. 9 illustrates exemplary devices of the MSIV system according to another implementation.

FIG. 9 illustrates exemplary devices of MSIV system 104 according to another implementation. In FIG. 2, MSIV system 104 is shown as including message application gateway device 204, verification server device 206, and message server devices 208. In contrast, MSIV system 902 includes two message application gateways 904-1 and 904-2, two verification server devices 906-1 and 906-2, and message server devices 208.

In MSIV system 902, user device 102-1 registers with a single message application server gateway 904-1 or 904-2. However, when user device 102-1 sends a message, the message is encoded/encrypted into two different messages, message copy A and message copy B. Message copy A and message copy B are sent to message application gateways 904-1 and 904-2, respectively. Each of message application gateways 904-1 and 904-2 performs functions similar to those described above for message application gateway 204. For example, each of message application gateways 904-1 and 904-2 sends/forwards its message copy (A or B) to appropriate message server device 208, obtains an message ID for the message copy, and sends a request to its corresponding verification server device 906-1 or 906-2 to create a hash/checksum. In response, each of verification servers 906 creates a hash/checksum.

Message server devices 208 send the message copy A and message copy B to user device 106-1, which then proceeds to verify each of the message copies via verification server devices 906-1 and 906-2. For each copy, if either of verification server devices 906-1 and 906-2 validates the sender (i.e., by comparing the hash/checksum sent from user device 106-1 to a hash/checksum in a verification server device 906-1 or 906-2), the sender of the copy is deemed validated. Once both of message copy A and message copy B are validated, user device 106-1 compares the message copy A and the message copy B. If the message copies match, user device 106-1 may conclude that the messages are valid and notify its user.

In contrast to MSIV system 104 of FIG. 2, MSIV system 902 renders impersonating user device 102-1 more difficult, by requiring user device 102-1 to send two copies (e.g., message copy A and message copy B) of the same message, over two different paths. Similarly, MSIV system 904 renders impersonating a MSIV system difficult, by requiring user device 106-1 to verify the both copies of the message and then to match the verified copies against one another.

MSIV system 902 may be modified in other ways. For example, when message application gateway devices 904-1 and 904-2 receive message copy A and message copy B, message application gateway devices 904-1 and 904-2 may cross-check the copies against one another, to ensure that both of the copies have been received. In this implementation, message application gateway devices 904-1 and 904-2 forward the message copy A and the message copy B toward user device 106-1 only if the cross-check verifies that the two copies are correct, When user device 102-1 sends message copy A and message copy B, user device 102-1 may encrypt each of the copies along with a unique message ID generated at user device 102-1. If an impersonator attempts to reuse a copy of the message-copy A and/or the message-copy B, message application gateway 904-1 or 904-2 would detect that the message ID is being reused, and therefore reject the duplicate message from the impersonator.

In another implementation, user device 102-1 may not merely copy an original message into message copy A and message copy B. Rather, user device 102 splits the message into two complementary message fragments via an encoding filter, to generate a message copy A and a message copy B.

At user device 106-1, to obtain the original message, user device 106-1 needs to recombine the message copy A and message copy B.

In FIG. 2, MSIV system 104 includes a single message application gateway device 204 and verification server device 206. In FIG. 9, MSIV system 902 includes two message application gateway devices 904-1 and 904-2 and two verification server devices 906-1 and 906-2. By extension, other MSIV systems may include more than two message application gateway devices and more than two verification server devices. In these implementations, user device 102-1 may send more than two copies/fragments of the original message, and user device 106-1 may validate and combine more than two copies/fragments of the original message. Increasing the number of message application gateway devices and verification server devices strengthens fortifications against impersonating devices at different points in network paths.

In some implementations, an MSIV system may include one message application gateway device and a corresponding verification server device that incorporate the functionalities of multiple message application gateway devices (e.g., devices 904-1 and 904-2) and multiple verification server devices (e.g., devices 906-1 and 906-2), respectively. In these implementations, the message application gateway device and the verification server device handle both of the message copy A and the message copy B.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, although MSIV system 104 has been described above in the context of MMS, SNPP, SMPP, etc., MSIV system 104 may also be adapted for email system or a session based system (e.g., Session Initiation Protocol (SIP) system) in which user device 106 (e.g., other end of a session) attempts to validate the identity of the calling device (e.g., user device 102) before establishing a communication session.

In another example, while series of blocks have been described with regard to an exemplary process illustrated in FIG. 6 and message flows in FIGS. 4, 5, and 7, the order of the blocks and messages may be modified in other implementations. In addition, non-dependent blocks may represent acts that can be performed in parallel to other blocks. Furthermore, one or more of the blocks may be omitted in other implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A system comprising:
   a plurality of message servers;
   a gateway, implemented at least partially in hardware, wherein the gateway is configured to:
      receive a first message from a client over a network;
      obtain a message identifier associated with the first message by routing the first message to a message server, of the plurality of message servers, that is on a path from the gateway to a remote device, wherein the message server is associated with the remote device;
      receive, from the message server and in response to routing the first message toward the message server, the message identifier associated with the first message, wherein the message identifier is assigned to the first message by the message server, and wherein the message identifier is unique to the first message; and
      send a request to a verification server to generate a first credential based on the first message, wherein the request includes the message identifier; and
   the verification server, implemented at least partially in hardware, wherein the verification server is configured to:
      receive the request and the message identifier from the gateway;
      generate, in response to the request, the first credential based on the message identifier;
      store the first credential;
      receive a second message from the remote device, the second message including a second credential, the message identifier associated with the first message, and a request to validate the second credential;
      retrieve the first credential;
      determine whether the second credential is valid based on the first credential; and
      send a notification to the remote device indicating whether the second credential is valid.

2. The system of claim 1, wherein the gateway and the verification server include a first device and a second device, respectively; or
   the gateway and the verification server include software applications and one or more network devices.

3. The system of claim 1, wherein the remote device includes one of:
   a tablet computer; a smart phone; a personal computer; a laptop computer; a gaming console; or a personal digital assistant.

4. The system of claim 1, wherein the first credential includes:
   a checksum;
   a hash generated based on information in the request; or
   a code generated by encrypting a portion of the request.

5. The system of claim 4, wherein the hash includes a hash generated from secure hash algorithm (SHA)-2 or SHA-3 encryption.

6. The system of claim 1, wherein the request includes:
   a timestamp indicating when the first message was sent from the client or when the first message was received at the gateway.

7. The system of claim 1, wherein the request includes at least one of:
   a network address associated with a recipient of the first message; or
   a telephone number associated with a recipient of the first message.

8. The system of claim 1, wherein when the gateway receives the first message, the gateway receives the first message in accordance with at least one of:
   the Short Message Peer-to-Peer (SMPP) protocol;
   the Telocator Network Paging protocol (TNPP);
   the Simple Network Paging Protocol (SNPP); or
   the multimedia messaging service (MMS) interfaces.

9. The system of claim 8, wherein the first message includes at least one of:
   a short message service (SMS) message;
   a multimedia messaging service (MMS) message;
   a rich communication service (RCS) message;
   a rich communication service (RCS) file;
   a rich communication service (RCS) chat; or
   enhanced messaging service (EMS) message.

10. The system of claim 1, wherein the gateway is further configured to receive registration information from a user device, wherein the registration information includes an identifier associated with a user of the user device and at least one of:
    a description; or
    a logo.

11. The system of claim 10, wherein the registration information further includes:
    a password and a user identifier for authentication.

12. The system of claim 11, wherein the gateway is further configured to:
    receive the user identifier and the password from the client; and
    verify that the first message is from the user based on the user identifier and the password.

13. The system of claim 10, wherein the gateway is further configured to forward the registration information to the verification server, and
    wherein the verification server is further configured to send a portion of the registration information to the remote device when the remote device requests the portion of the registration information.

14. One or more non-transient computer readable media comprising computer-executable instructions, wherein when the computer-executable instructions are executed by one or more processors, the one or more processors are configured to:
    receive registration information associated with a user from a first device;
    receive a first message from a client over a network;
    verify that the first message is from the user based on the registration information;
    in response to verifying that the first message is from the user:
       obtain a message identifier associated with the first message by routing the first message to a server configured to route the first message toward a remote device wherein the server is associated with the remote device,
       receive, from the server, the message identifier associated with the first message, wherein the message identifier is assigned to the first message by the server, and wherein the message identifier associated with the first message is unique to the first message,
generate a first credential based on the message identifier associated with the first message, and
store the first credential;
receive a second message from the remote device, the second message including the message identifier associated with the first message, a second credential, and a request that the second credential be verified;
determine whether the second credential is valid based on the first credential in response to the second message; and
send a notification to the remote device indicating whether the second credential is valid.

15. The one or more non-transient computer readable media of claim 14, wherein the first credential includes a hash or a checksum generated based on data associated with the first message or a code generated by encrypting the data associated with the first message.

16. The one or more non-transient computer readable media of claim 14, wherein the first credential is further based on:
a timestamp associated with the first message, or
a destination address associated with the first message.

17. The one or more non-transient computer readable media of claim 14, wherein the registration information includes: an identifier associated with the user, a description of the user, or a logo.

18. The one or more non-transient computer readable media of claim 14, wherein when the one or more processors verify that the first message is from the user, the one or more processors perform authentication based on a user password and a user identifier provided along with the first message and the registration information.

19. A method comprising:
receiving registration information of a user from a first device, wherein the registration information includes a first user identifier and a first password;
receiving a first message, a second user identifier, and a second password from a client over a network;
verifying that the first message is from the user based on the first user identifier, the first password, the second user identifier, and the second password;
obtaining a message identifier associated with the first message by routing the first message toward a message server configured to route the first message toward a remote device in response to successfully verifying that the first message is from the user, wherein the message server is associated with the remote device;
generating a first hash based on the message identifier associated with the first message, wherein the message identifier is assigned to the first message by the message server, and wherein the message identifier is unique to the first message;
storing the first hash;
receiving a second message from the remote device requesting that a second hash be validated, wherein the second message includes the second hash and the message identifier associated with the first message;
determining whether the second hash is valid based on the first hash; and
sending a notification to the remote device indicating whether the second hash is valid.

20. The method of claim 19, wherein the first hash is further based on a timestamp indicating when the first message was sent from the client.

* * * * *